Figure 8:
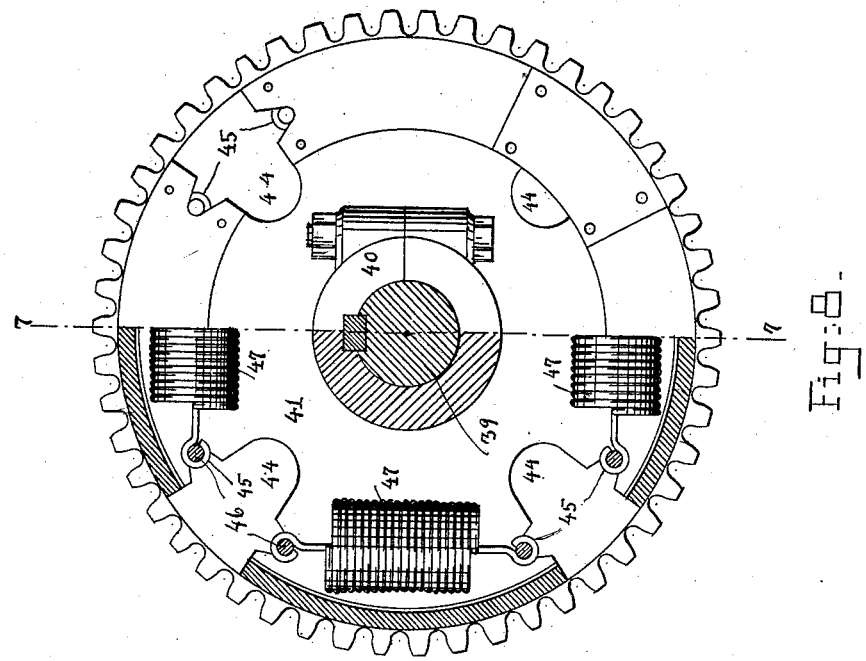

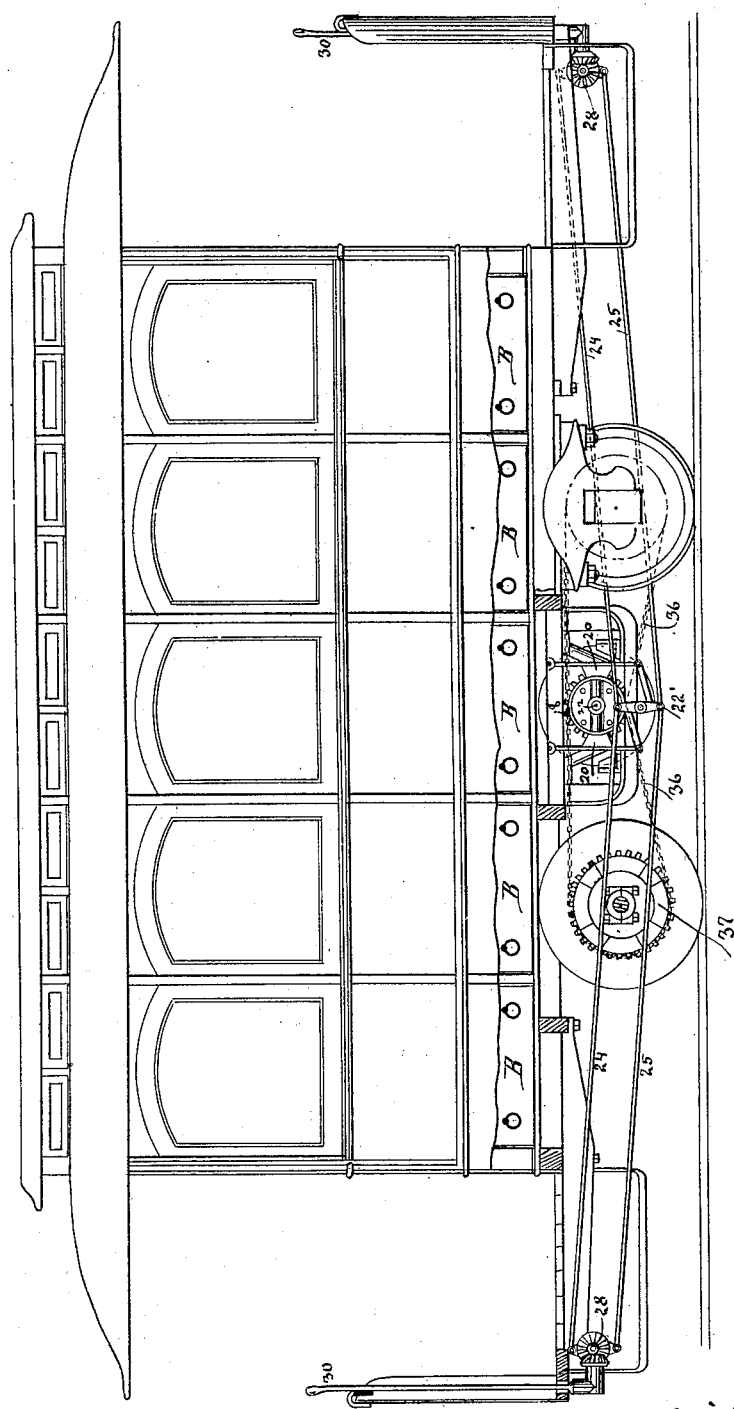

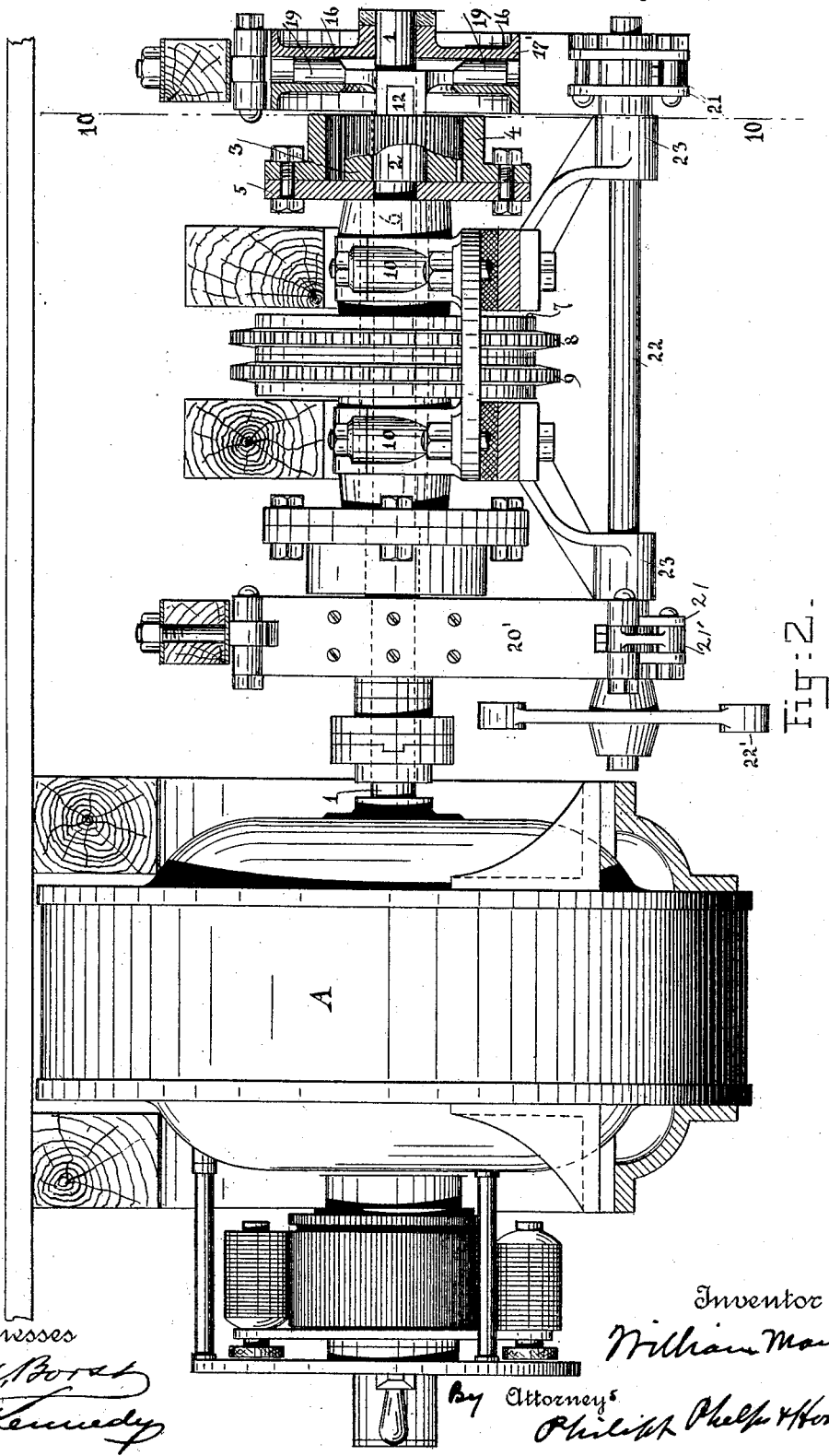

(No Model.) 5 Sheets—Sheet 3.
W. MAIN.
METHOD OF VEHICLE PROPULSION.
No. 407,095. Patented July 16, 1889.
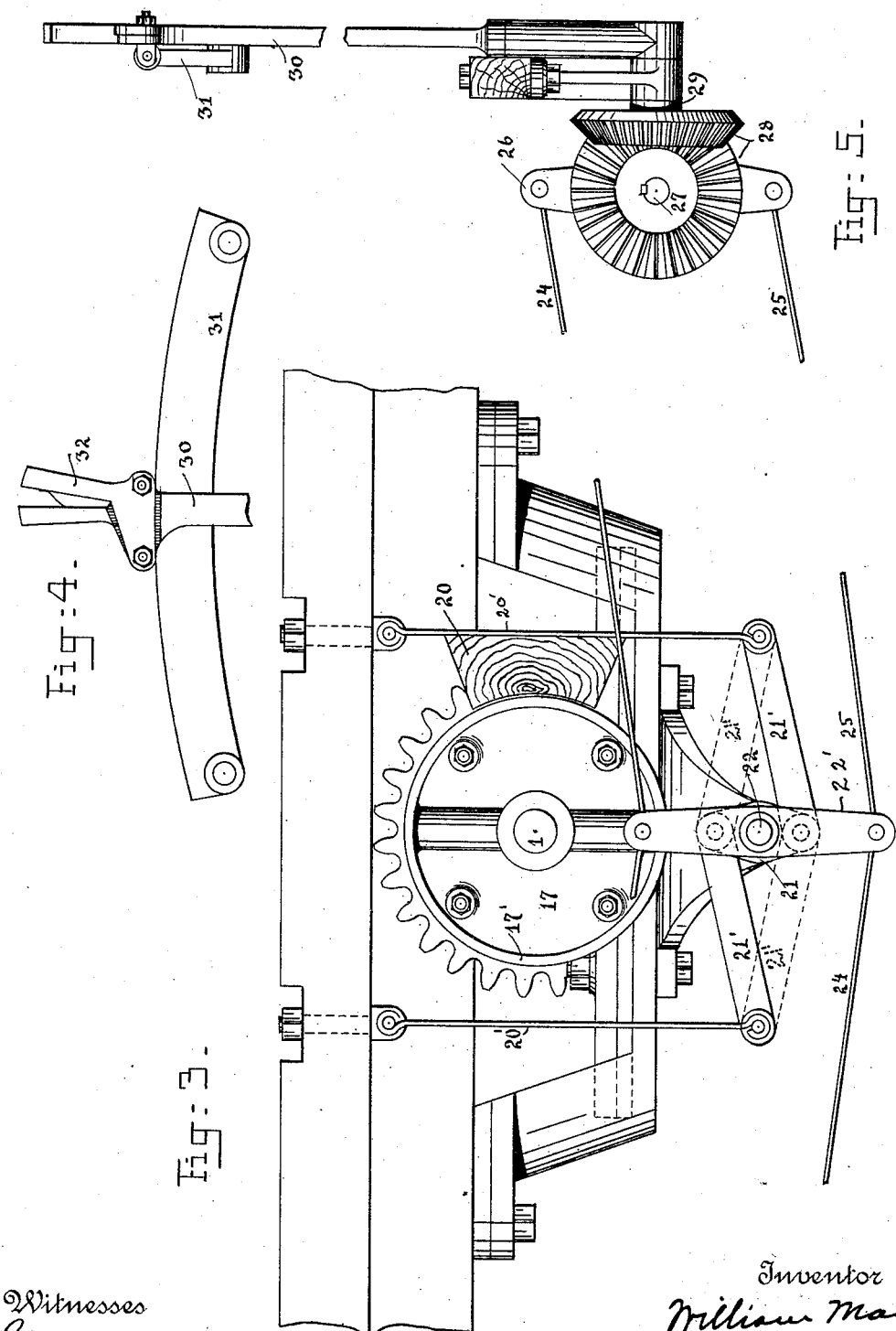
Witnesses
Inventor
William Main
By his Attorneys (No Model.) 5 Sheets—Sheet 4.

W. MAIN.
METHOD OF VEHICLE PROPULSION.

No. 407,095. Patented July 16, 1889.

Witnesses
Inventor
William Main
By his Attorneys (No Model.) 5 Sheets—Sheet 5.
W. MAIN.
METHOD OF VEHICLE PROPULSION.

No. 407,095. Patented July 16, 1889.

United States Patent Office.

WILLIAM MAIN, OF BROOKLYN, NEW YORK.

METHOD OF VEHICLE-PROPULSION.

SPECIFICATION forming part of Letters Patent No. 407,095, dated July 16, 1889.

Original application filed October 28, 1887, Serial No. 253,610. Divided and this application filed May 15, 1889. Serial No. 310,832. (No model.)

*To all whom it may concern:*

Be it known that I, WILLIAM MAIN, a citizen of the United States, residing at Brooklyn, county of Kings, and State of New York, have invented certain new and useful Improvements in Methods of Vehicle-Propulsion, fully described and represented in the following specification and the accompanying drawings, forming a part of the same.

My invention relates to the propulsion of cars and other vehicles by electric motors and storage or secondary batteries carried thereby; and it consists in part in a method whereby the starting of such vehicles is effected while the motor-shaft is revolving at high speed. In this manner the full motor-power is utilized in starting, and the danger of injury to the motor-coils and to the battery-plates as commonly experienced is avoided.

In an application for Letters Patent filed by me on the 28th day of October, 1887, Serial No. 253,610, and of which the present application is a division, I have shown and described an organization whereby my improved method may be practiced. In said application I have pointed out the difficulties in the practical employment of electric motors and batteries for the running of vehicles which my present invention is designed to overcome. Among these difficulties has been this, that the starting of the vehicle as ordinarily effected requires a much greater amount of power than its propulsion after starting, necessitating the carriage of a very great amount of battery material which otherwise would not be required, besides an otherwise unnecessary size of motor. This difficulty results from the fact that the inertia of the vehicle has to be overcome at the moment of starting.

Another serious difficulty encountered has been that the coils of the motor are, in starting the car, subjected to liability of burning out, for the reason that at such times the motor, revolving at a slow rate of speed, develops little or no counter electro-motive force, the entire force of the current then acting upon the wires of the coils and creating great heat. It will be understood that when the motor revolves at its normal speed in the propulsion of the car it tends to generate a current running counter to the main current, and thus reduces the tension of the latter, and that when the speed of rotation is materially diminished this counter electro-motive force is in like degree decreased, and by the same amount the effect of the propelling-current upon the coils of the motor in the way of heating is increased, from which the danger to the coils arises.

A still more serious difficulty is encountered in the liability of the battery-plates to injury. This arises from the fact that the most favorable conditions for the use of storage-batteries are those in which the demands upon them are constant and not subject to sudden or extreme variations, such as the changes in tension above referred to. The effect of such variations where storage-batteries in which active material mechanically applied or attached to conducting supports is used is to cause disintegration of the masses or wads of active material at the points where they come in contact with the conducting-supports, promoting the formation of sulphate at those points and rapidly effecting the separation of the active material from the conducting-supports, and thus causing a liability of the active material to drop away from the conducting-supports and accumulate in the bottom of the cell.

If the motor in starting revolves, as has heretofore been the case, at a slow speed, developing little counter electro-motive force, the drain on the battery is, for the brief period of starting, very severe, and is likely to result in rapid deterioration of the plates. Similar difficulties are encountered whenever it becomes necessary to reduce the speed of the moving vehicle below normal, as on ascending a grade, or for other cause. If this is effected by or attended by a reduction in the rate of revolution of the motor-shaft, there is commonly a reduction of counter electro-motive force, with a probability of injurious results to the battery and motor.

These difficulties are overcome in the practice of my invention in the following manner: Instead of providing a permanent gear-connection between the motor-shaft and the vehicle-driving shafts, as is usual, I make that connection so that it may be interrupted and the motor-shaft permitted to rotate while the vehicle is at rest. Instead of arresting the rotation of the motor when stopping the vehicle, in making short stops, I propose to temporarily interrupt the driving-connection, permitting the rotation of the motor to continue. On starting the vehicle the motor and battery will be in full operation and ready to exert their full power before the driving-connection is effected. The motor, since it is revolving rapidly, will be operating with its maximum efficiency, and with its connected parts will exercise a considerable momentum, which will be utilized in overcoming the inertia of the car when the driving connection is made. The counter electro-motive force is fully developed and heating of the motor-coils and deterioration of the battery-plates are avoided. As stated, where stops are short, the rotation of the motor is not arrested. Where stops are of such a length that it is desirable to stop the consumption of battery energy, the motor is arrested; but the process of starting in the latter case is precisely the same as that above described, the motor being put in circuit with the battery and given a rapid rotation before the driving-connection with the vehicle-shaft is made. The developed momentum of revolution and the fact that the motor is thus enabled to work with its maximum efficiency make it possible to start the car with a motor and battery power little, if any, greater than is required to keep the car in movement after the start is effected.

I propose to effect the driving-connection from the motor-shaft by means of a friction-gear mechanism, since such a mechanism may be brought into gradual operation and jars to the driven machinery avoided. I also propose, in order to graduate the speed of the car in starting without interfering with the rotation of the motor-shaft at normal speed, to provide two or more sets of differently-proportioned power-transmitting connections, one or the other of which may be utilized as desired, and in passing from one speed of vehicle to another, whether in starting or after the vehicle is fully under way, I simply change from one to the other of these transmitting connections, the flow of battery-current and rotation of motor being uninterrupted and within reasonable limits uniform.

In the drawings annexed and forming a part of this specification is illustrated one form of mechanism by the use of which my present invention may be practiced.

Figure 7:
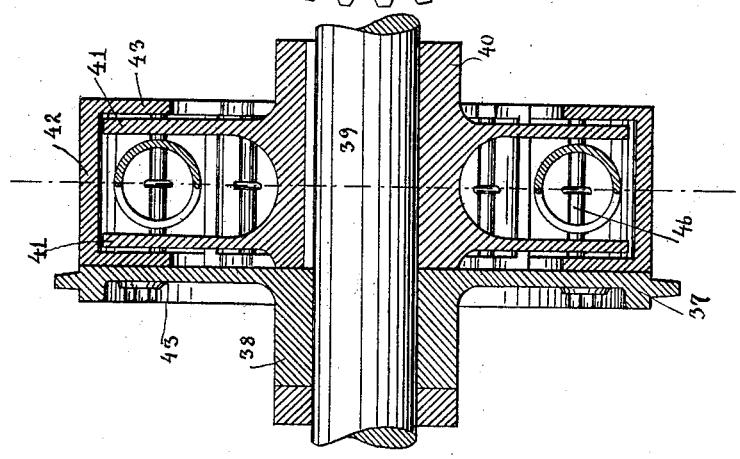
Figure 6:
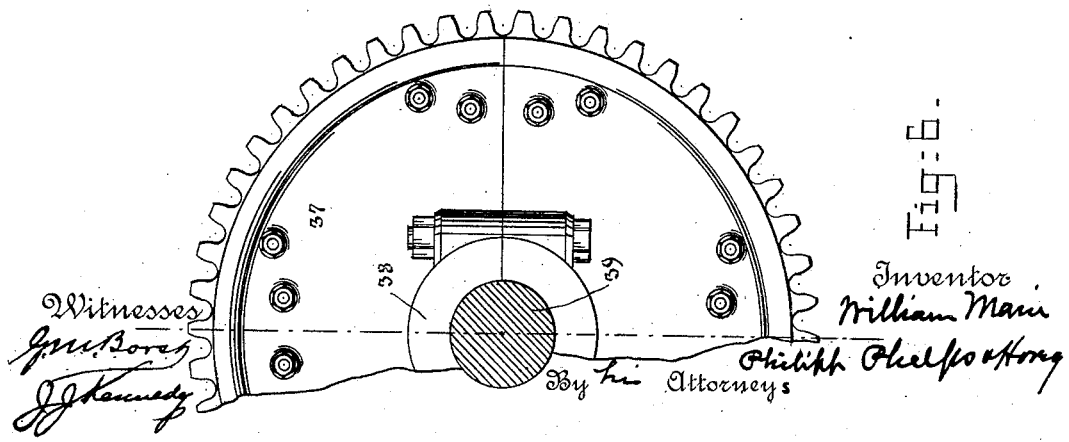
Figure 10:
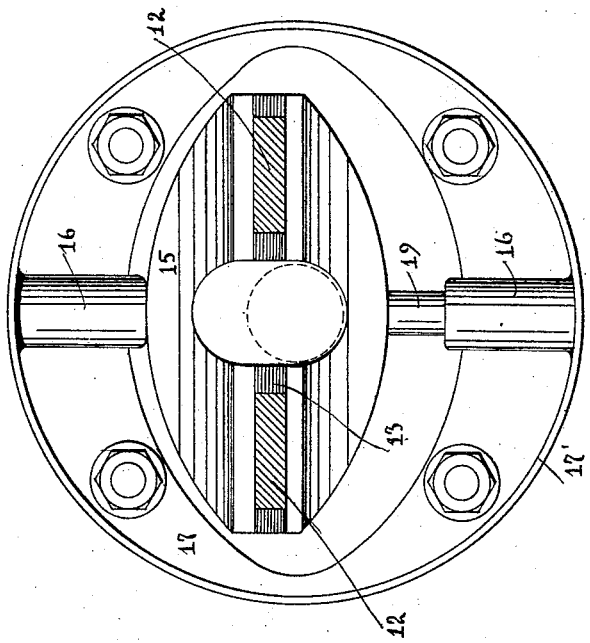
Figure 9:
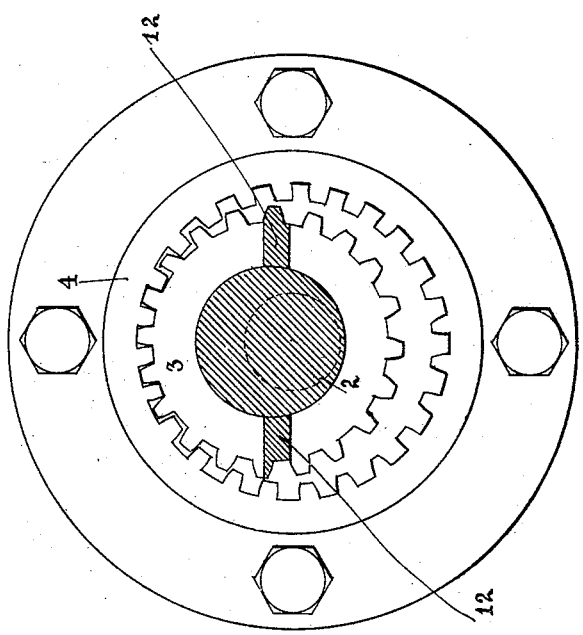

Figure 1 is a side view, partly in section, of said car. Fig. 2 is a side view of the motor and power-transmitting device mounted upon the shaft thereof. Fig. 3 is an end view of the motor-shaft and a part of the power-transmitting device upon an enlarged scale. Figs. 4 and 5 are details on the same scale of mechanism for controlling the movement of the car. Figs. 6, 7, and 8 represent on the same enlarged scale spring connecting devices between the motor and the driven axle, Fig. 6 being a side view, Fig. 7 a vertical section on the line 7 7, Figs. 6 and 8, and Fig. 8 a side view, partly in section, on the line 8 8, Fig. 7; and Figs. 9 and 10 are detail views on an enlarged scale of the motion-reducing device, Fig. 9 being a section on the line 10 10, Fig. 2, the point of view being to the right of said line, and Fig. 10 a section taken on the same line, the point of view being to the left of said line.

Suspended beneath the frame-work of the cars is the motor A, the main shaft of which is connected through the motion-reducing mechanism with the axle of the car-truck. This motion-reducing mechanism will first be described. The shaft 1 of the motor carries fast upon it an eccentric 2, which moves freely in a circular opening within gear-wheel 3, which gear-wheel constitutes the fixed or initial member of a "sun-and-planet" series of gears. Outside of and about this gear-wheel is an annular gear 4, concentric with the driving-shaft 1, and bolted to a flange 5 of a sleeve or hollow shaft 6, shown in Fig. 2 partly by broken lines mounted upon the main shaft and carrying at its inner end a flange 7, upon which is formed a sprocket-wheel 8, from which the power is transmitted to one of the car-axles. The sleeve 6 rests in suitable bearings 10, secured to the car-frame. On the inner side of the sprocket-wheel 8 is arranged upon the motor-shaft another sprocket-wheel 9, rigid with the wheel 8, and from which the power is transmitted to the other car-axle, and a second set of devices identical with those above described, except that the ratio between the inner and outer gear-wheels is varied.

Upon the inner gear-wheel 3 (see particularly Figs. 2, 10, and 11) are cast lugs 12, fitted to and adapted to slide in a recess or channel 13, formed in a cross-head 15. This cross-head is in turn provided with cylindrical lugs 19, fitting cylindrical sockets 16, formed in a pulley 17, mounted upon and rotating freely about the main shaft. Pulley 17 has a rim 17', which serves as a friction-wheel. The cross-head 15 has an oblong central opening which permits it to move in the direction of its lugs 19 over the main shaft 1. It is obvious that the gear 3 and the pulley 17 will maintain fixed positions relative to each other as regards rotation, their absolute relative positions changing as the shaft 1 revolves to the extent of the sliding motion of the cross-head 15 in pulley 17 and of lugs 12 in channel 13, caused by the eccentric position of the gear 3 with reference to the axis of the pulley 17, the lugs 12 and cross-head 15 constituting double slides, moving in right lines and uniting the gear and the pulley as regards circular motion. Consequently when the pulley 17 freely revolves about its axis the gear 13 is also free, and will convey no power from the shaft to the outer gear 4. When, however, the pulley 17 is locked or held fast in one position, the gear 3 will be carried about by the eccentric in a position constantly parallel to itself, and will communicate to the outer gear 4 a rotating motion reduced to an extent dependent upon the ratio between the two gears. The amount of this reduction may be readily calculated according to well-known rules, which require no special explanation here.

It is necessary to provide devices for the locking of the pulley 17, in order to effect the transmission of power through the gears, and for this purpose I prefer to use a friction-clutch, although any other form of clutch mechanism—for instance, a spring-clutch—may be employed, as illustrated in Figs. 1, 2, 3, and 4, wherein brake-shoes 20 are shown attached to pivoted hangers 20', the lower ends of these hangers being connected by rods 21' to a cross-piece 21, fastened upon a shaft 22, mounted in bearings 23, which shaft is revolved as desired to throw the shoes to or from the rim 18 by rods 24 and 25, two sets of which are provided, passing from cross-piece 22', fixed upon the shaft 22, to each end of the car, and connecting at each end with a cross-bar 26 upon a shaft 27, the latter shaft being connected by bevel-gears 28 with a shaft 29, attached to a lever 30, adapted to move along a segmental bar 31, and to be arrested by a spring-catch 32 at any desired point thereof, in the manner usual with railroad-switch and similar levers. In the mechanism shown two of these sets of brake-shoes are employed, one for each of the pulleys 17, so connected with their cross-pieces 21 that in one position of the shaft 22 one of the said pulleys is arrested and the other released, and in the other position thereof the action of the shoes upon the pulleys is reversed. The arrangement of the second set of rods 21' is shown in broken lines in Fig. 3. By the use of this mechanism the position of the controlling-shaft 22 may be determined and adjusted from either end of the car by the use of the appropriate levers, and either one of the two sets of gears may thus be brought into operation according to the speed to be given to the car, and both may be thrown out of operation in order to suspend the action of the motor upon the car-axles by causing the shaft to assume an intermediate position, wherein neither of the pulleys will be held.

The motor is driven by the current from the storage-battery B, mounted on the car. Power is transmitted from sprocket-wheel 8 to one of the car-axles and from wheel 9 to the other by means of chains 36, passing one to the forward and the other to the rear axle and engaging with other sprocket-wheels 37, mounted thereon in a manner and with connected parts which will be described. The sprocket-wheel 37 consists in each case of a circular flange carrying the sprocket-teeth and integral with a hub 38, mounted so as to revolve freely upon the axle 39. Adjoining the hub 38 is a sleeve 40, keyed to the axle and provided with two circular flanges 41, parallel to each other and a short distance apart. To the flanges 37 is bolted a circular cap 42, having two inwardly-projecting circular flanges 43, embracing the flanges 41. Flanges 41 are provided with a suitable number of recesses or openings 44, of which four are shown in this instance, and the flanges 43 are provided with an equal number of similar openings so placed as to accurately register with the recesses 44. In both the flanges 41 and 43 and in the sides of the openings above described are placed notches 45, registering with each other in all the flanges and adapted to serve as bearings for transverse rods 46, which rest in them, and which rods are connected in pairs by springs 47, which springs will normally hold the two sets of flanges in such relation to each other that the openings or recesses therein will precisely register, as shown in Fig. 8. With this construction the stress of the motor when thrown upon the flange 37 will tend to turn the flange 37 and the hub 38 upon the axle, and this tendency will be resisted by the rods 46 and springs 47. The springs are of such tension as to permit a certain small amount of movement between the parts which they connect; but after permitting such slight movement their strength is sufficient to transmit the driving-power of the motor. It results that the flange 37 and the sleeve 40, and consequently the axle 39, after the play of the springs is exhausted, move together and give motion to the car, and it will be observed that it is immaterial in which direction the flange 37 is caused to revolve, the result with either direction of motion being the same so far as the action of the springs and flanges is concerned. In other words, the car may be caused to move forward or backward with precisely the same operation in each case of the power-transmitting mechanism by reversing the direction of rotation of the motor-shaft.

In starting a car in accordance with my invention the shaft 32 is so placed that neither of the sets of gears is in operative relation to its shaft. The battery-circuit is closed through the motor and the latter allowed to rotate its shaft up to its normal working speed. One of the sets of gears is now thrown into operative connection with the motor-shaft, a little slip being preferably permitted to the pulley between the brake-shoes at first, and motion is imparted from the revolving shaft to the car. If it is desired to graduate still further the starting speed of the car, the slower of the transmitting-gears is first thrown in and then the faster.

After starting, the speed of the car is varied by changing in like manner from one set of gears to the other without interrupting the flow of battery-current or materially varying the speed of rotation of the motor-shaft. Thus in climbing a grade it is desirable that the motion of the car should be slower, while the rotation of the motor-shaft continues to be rapid, and these conditions are secured by throwing in a slower set of transmitting-gears.

It will be understood that the novel features in construction hereinbefore described are the subject-matter of other pending applications, Serial Nos. 253,610, filed October 28, 1887, and 283,355, filed August 20, 1888, and are not claimed in this application, which is restricted wholly to the method of attaining the desired results, and that the apparatus herein described is only one of many forms of apparatus adapted to the practice of my present invention, and that I do not limit myself to any particular device or combination of devices.

Any device whereby the transmission of power from the motor-shaft may be interrupted at will and caused to be resumed while that shaft is rotating may be substituted for the devices shown herein.

My invention may be practiced with but a single power-transmitting device and without provision for changing speed, if desired. Any other suitable form of gearing, whether frictional or not, may be substituted for that shown. The spring-bearings on the driving-axles of the car are not essential to an apparatus adapted for the practice of my invention, but are shown herein for the reason that they are a part of the best form of organized apparatus now known to me. The driving-connection may be made with both shafts or axles of the vehicle, as shown, or with but one.

Having thus described my invention, what is claimed is—

1. In the propulsion of vehicles and the like by electric motors actuated by batteries, the method of changing the speed of the vehicle while causing the least possible deterioration of the battery, which consists in maintaining the flow of the current from the battery and maintaining, as nearly as practicable, a constant rate of revolution for the motor and varying the ratio of transmission between the motor-shaft and the driving-shaft to correspond to the speed desired, substantially as described.

2. In the propulsion of vehicles and the like by electric motors actuated by batteries, the method of obtaining the maximum effect from the motor in starting while causing the least possible deterioration of the battery, which consists in first causing the motor to revolve disconnected from the driving-shaft of the vehicle and then effecting a power-transmitting connection between the revolving motor-shaft and the driving-shaft, substantially as described.

3. In the propulsion of vehicles and the like by electric motors actuated by batteries, the method of obtaining the maximum effect from the motor in starting while causing the least possible deterioration of the battery, which consists in first causing the motor to revolve disconnected from the driving-shaft of the vehicle, then effecting a power-transmitting connection between the revolving motor-shaft and the driving-shaft, and gradually attaining the speed of locomotion desired by gradually increasing the ratio of transmission between the motor-shaft and driving-shaft, substantially as described.

In testimony whereof I have hereunto set my hand in the presence of two subscribing witnesses.

WILLIAM MAIN.

Witnesses:
J. J. KENNEDY,
THOMSON H. PALMER.